B. H. MEYERING.
PHOTOGRAPHIC FILM CARTRIDGE.
APPLICATION FILED JULY 31, 1914.
1,225,988.
Patented May 15, 1917.
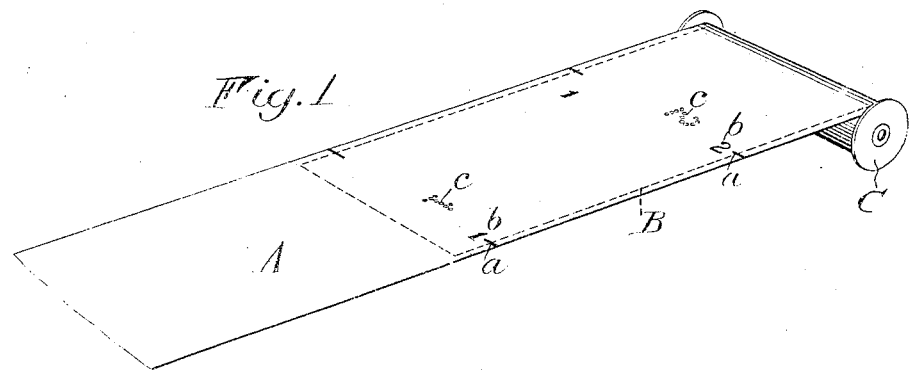
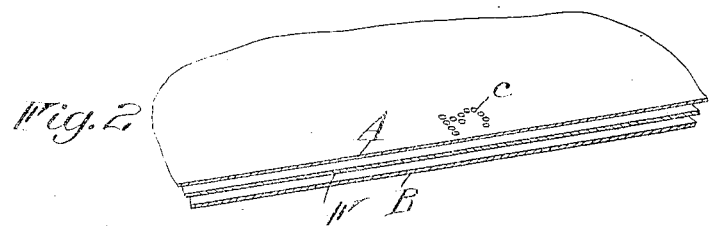
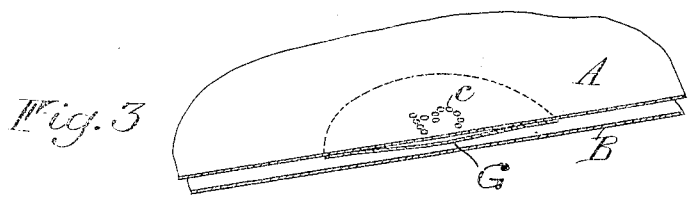
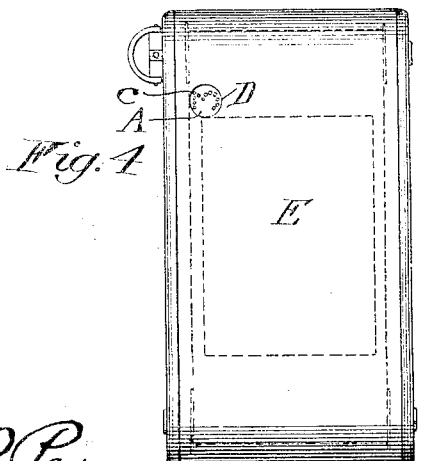
Witnesses
Walter B. Payne
Frederick E. Fox
Inventor
Bernard H. Meyering
By
His Attorneys

UNITED STATES PATENT OFFICE.

BERNARD H. MEYERING, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM CARTRIDGE.

1,225,988.  Specification of Letters Patent.  Patented May 15, 1917.

Application filed July 31, 1914. Serial No. 854,218.

*To all whom it may concern:*

Be it known that I, BERNARD H. MEYERING, of Rochester, in the county of Monroe and State of New York, have invented certain new and useful Improvements in Photographic-Film Cartridges; and I do hereby declare the following to be a full, clear, and exact description of the same, reference being had to the accompanying drawings, forming a part of this specification, and to the reference-numerals marked thereon.

My present invention relates to film cartridges embodying sensitized photographic film and a covering strip and has for its object to provide means for light printing upon the film, designations indicating the separate exposures made in the camera so that the negatives may be distinguished preferably by the same or similar designations as those which appear on the flexible cover when the exposures are made.

In the drawings:

Figure 1 is a perspective view of a film cartridge embodying my invention;

Fig. 2 is a sectional view of the film and covering strip;

Fig. 3 is a view of a modification; and

Fig. 4 is a view of a portion of the rear wall of a roll holder or camera showing the exposure designation at the edge.

Similar reference numerals throughout the several figures indicate similar parts.

A indicates the usual flexible strip of black paper or similar opaque protecting material on the back of which are placed the usual or any suitable marks or designations $a$ and $b$, usually placed near the margin, for indicating the separate exposures and B the flexible sensitized film which is wound with the paper upon spool C.

In order to cause the numerals or other characters designating the separate exposures to appear on the negatives, I provide the opaque strip A with perforations $c$ in the outline of the numeral or character corresponding to the one that is visible through the opening or window in the back of the camera or roll holder, so that when such perforated portion is exposed to light sufficient actinic light may pass through the perforations and fog the film in the outline thereof and will therefore appear in the finished negative.

It is desirable, of course, that these designations appear at one side of the negative or between the negatives and therefore in Fig. 1, I have shown the designating apertures $c$ near the points of severance of the film and between the sides, in this instance the light printing is to be accomplished through an aperture formed in the back of the camera or roll holder. It will be understood, however, that such perforated portions could be arranged at or near the margin of the film strip and at one end of the exposure and themselves form the indications visible through a rear aperture in the camera or holder to determine when a new exposure of film is wound into place. This arrangement is shown in Fig. 4 of the drawing in which E represents the rear of the camera or holder and D the aperture therein, the outline of the exposure opening for the picture being indicated by the dotted lines.

In order to prevent the light passing through the perforations in the opaque covering from fogging the film unduly and rendering the designations indistinct or to reduce its intensity, I provide preferably beneath the perforations a translucid covering preferably such as paper which will permit the passage of sufficient actinic light to print the designations on the film while preventing halation. This covering material may be in the form of a strip of red translucent paper F wound with the covering strip A and the film B, as shown in Fig. 2, and substantially of the same length as either or both of them or I may employ separate wafers or strips of such paper beneath the perforated portion, as shown in Fig. 3, G indicating such protecting strip, a trifle larger than the extent of the perforation. Instead of locating this light tempering cover on the cartridge it might be formed by the red celluloid covered window or aperture usually employed on the camera back for determining the winding of the film and covering, although in this instance said window would have to be located near the end of the exposure, as indicated in Fig. 4, to prevent interference with the picture being taken.

While I prefer to form the designations in the opaque cover strip by small round perforations arranged to form numbers as shown, it will be understood that the characters or numbers could be entirely cut out, but by employing small perforations said strip is not unduly weakened and the liability of tearing is reduced.

I claim as my invention:

1. A photographic film cartridge embodying a flexible strip of sensitive film and an opaque flexible covering strip wound with it into a roll, said covering strip being provided with a plurality of light permeable portions each adapted, when the backing and film are unrolled, to transmit light to a restricted area of the film in the form of a designating character to be light printed thereon.

2. A film cartridge embodying a flexible strip of sensitized film, an opaque flexible covering strip wound with it into a roll, said covering strip having perforations therein forming designating characters and permitting the passage of light to the film when the strip is exposed to light and a translucent covering for reducing the intensity of the light passing to the film through said perforations.

BERNARD H. MEYERING.

Witnesses:
JOHN E. SHEARER,
C. E. MARTIN.